United States Patent
LeVesque (10) Patent No.: US 10,096,922 B2
(45) Date of Patent: Oct. 9, 2018

(54) REARVIEW MIRROR ASSEMBLY WITH BIASED ELECTRICAL CONNECTION

(71) Applicant: Gentex Corporation, Zeeland, MI (US)

(72) Inventor: Andrew J. LeVesque, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/804,111

(22) Filed: Nov. 6, 2017

(65) Prior Publication Data

US 2018/0131113 A1 May 10, 2018

Related U.S. Application Data

(60) Provisional application No. 62/418,415, filed on Nov. 7, 2016.

(51) Int. Cl.

| | |
|---|---|
| *A47G 1/24* | (2006.01) |
| *H01R 12/79* | (2011.01) |
| *H01R 12/71* | (2011.01) |
| *H01R 4/242* | (2018.01) |
| *H01R 12/77* | (2011.01) |
| *H01R 13/64* | (2006.01) |
| *H01R 43/26* | (2006.01) |
| *B60R 1/04* | (2006.01) |
| *B60R 1/12* | (2006.01) |
| *H01R 13/24* | (2006.01) |

(52) U.S. Cl.
CPC ............... *H01R 12/79* (2013.01); *B60R 1/04* (2013.01); *B60R 1/12* (2013.01); *H01R 4/242* (2013.01); *H01R 12/714* (2013.01); *H01R 12/716* (2013.01); *H01R 12/774* (2013.01); *H01R 12/777* (2013.01); *H01R 13/2407* (2013.01); *H01R 13/64* (2013.01); *H01R 43/26* (2013.01); *H01R 13/2421* (2013.01)

(58) Field of Classification Search
CPC .. B60R 1/04; B60R 1/06; B60R 1/072; A47G 1/24
USPC .................. 248/481–487; 359/843, 871–877
See application file for complete search history.

(56) References Cited

U.S. PATENT DOCUMENTS

| | | | |
|---|---|---|---|
| 4,225,212 A | 9/1980 | Grabowski | |
| 4,646,210 A | 2/1987 | Skogler et al. | |
| 5,190,499 A | 3/1993 | Mori et al. | |
| 5,572,354 A | 11/1996 | Desmond et al. | |
| 5,798,688 A | 8/1998 | Schofield | |
| 5,877,897 A * | 3/1999 | Schofield | B60N 2/002 348/E7.086 |
| 5,971,553 A | 10/1999 | Durnwald | |
| 6,068,380 A | 5/2000 | Lynn et al. | |

(Continued)

*Primary Examiner* — Phuong Chi T Nguyen
(74) *Attorney, Agent, or Firm* — Price Heneveld LLP; Bradley D. Johnson (57) ABSTRACT

A rearview mirror assembly is provided herein and includes a printed circuit board (PCB) and an electrical connector electrically coupled to the PCB. The assembly also includes at least one biasing member that is electrically conductive and positioned between and in contact with the PCB and the electrical connector. The at least one biasing member is configured to compress or expand in response to displacement of the electrical connector. Compression or expansion of the at least one biasing member serves to maintain an electrical connection between the PCB and the electrical connector.

20 Claims, 6 Drawing Sheets (56) References Cited

U.S. PATENT DOCUMENTS

| | | |
|---|---|---|
| 6,243,003 B1 | 6/2001 | DeLine et al. |
| 6,300,879 B1 | 10/2001 | Regan et al. |
| 6,315,421 B1 | 11/2001 | Apfelbeck et al. |
| 6,326,613 B1 | 12/2001 | Heslin et al. |
| 6,420,975 B1 * | 7/2002 | DeLine .................... B60R 1/12 340/425.5 |
| 6,467,919 B1 | 10/2002 | Rumsey et al. |
| 6,483,438 B2 | 11/2002 | DeLine et al. |
| 6,499,850 B2 | 12/2002 | Waldmann |
| 6,501,387 B2 | 12/2002 | Skiver et al. |
| 7,249,860 B2 | 7/2007 | Kulas et al. |
| 7,370,985 B2 | 5/2008 | Boddy et al. |
| 8,201,800 B2 | 6/2012 | Filipiak |
| 9,134,585 B2 | 9/2015 | Tonar et al. |
| 9,475,431 B2 * | 10/2016 | Brummel .................. B60R 1/04 |
| 2005/0128610 A1 | 6/2005 | Parker et al. |
| 2007/0001356 A1 | 1/2007 | Adoline et al. |
| 2016/0243987 A1 | 8/2016 | Kendall |
| 2017/0129406 A1 * | 5/2017 | Uken ....................... B60R 1/12 |
| 2018/0056871 A1 * | 3/2018 | Karner ................ B29C 45/0017 |

* cited by examiner

REARVIEW MIRROR ASSEMBLY WITH BIASED ELECTRICAL CONNECTION

CROSS-REFERENCE TO RELATED APPLICATION

This application claims priority to U.S. Provisional Application No. 62/418,415, filed on Nov. 7, 2016, entitled "REARVIEW MIRROR ASSEMBLY WITH BIASED ELECTRICAL CONNECTION," the entire disclosure of which is incorporated by reference herein.

FIELD OF THE DISCLOSURE

The present disclosure generally relates to a rearview mirror assembly, and more particularly, to an improved electrical connection between a printed circuit board and an electrical cable.

SUMMARY OF THE DISCLOSURE

According to one aspect of the present disclosure, a rearview mirror assembly is provided and includes a printed circuit board (PCB) and an electrical connector electrically coupled to the PCB. The assembly also includes at least one biasing member that is electrically conductive and positioned between and in contact with the PCB and the electrical connector. The at least one biasing member is configured to compress or expand in response to displacement of the electrical connector. Compression or expansion of the at least one biasing member serves to maintain an electrical connection between the PCB and the electrical connector.

According to another aspect of the present disclosure, a rearview mirror assembly is provided and includes a housing, a printed circuit board (PCB) disposed inside the housing, and a guide member coupled to the PCB. An electrical cable is provided inside the housing and has a plurality of electrical wires terminally connected to an electrical connector received in the guiding member and electrically coupled to the PCB. A plurality of biasing members are each positioned between and in contact with the PCB and the electrical connector for electrically coupling a corresponding one of the plurality of electrical wires to the PCB. The plurality of biasing members are configured to compress or expand in response to displacement of the electrical connector in relation to the guide member. Compression or expansion of the plurality of biasing members serves to maintain an electrical connection between the PCB and the electrical connector.

According to yet another aspect of the present disclosure, a rearview mirror assembly is provided and includes a housing and an electrical cable fed through the housing and having a plurality of electrical wires terminally connected to an electrical connector secured to a rear interior surface of the housing. A printed circuit board (PCB) is disposed inside the housing to face the rear interior surface and has a guide member coupled thereto and configured to receive the electrical connector therein. A plurality of biasing members are each configured to electrically couple a corresponding one of the plurality of electrical wires to the PCB. The PCB is assembled to the housing via a self-aligning feature in which the electrical connector is blindly mated to the guide member. When the electrical connector is mated to the guide member, each of the plurality of biasing members is positioned between and in contact with the PCB and the electrical connector. The plurality of biasing members are configured to compress or expand in response to displacement of the electrical connector in relation to the guide member. Compression or expansion of the plurality of biasing members serves to maintain an electrical connection between the PCB and the electrical connector.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

The present illustrated embodiments reside primarily in combinations of method steps and apparatus components related to rearview mirror assemblies. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

Figure 1A:
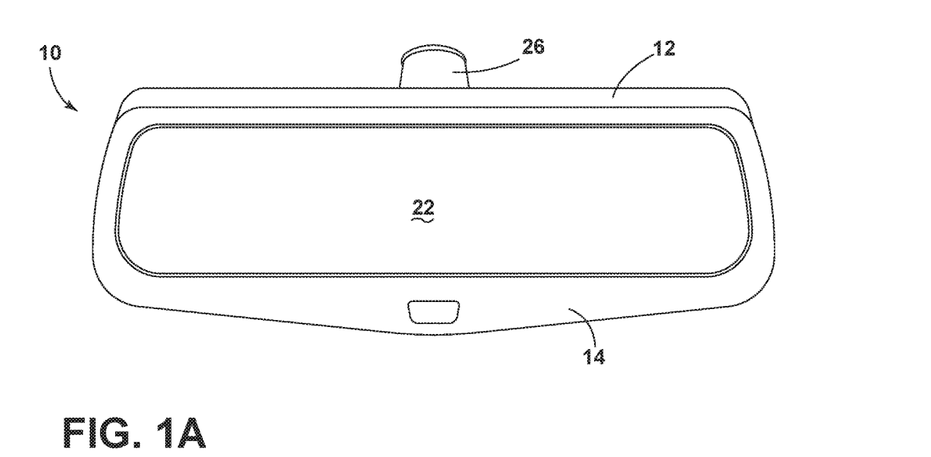
FIG. 1A is a front perspective view of a rearview mirror assembly.
Figure 1B:
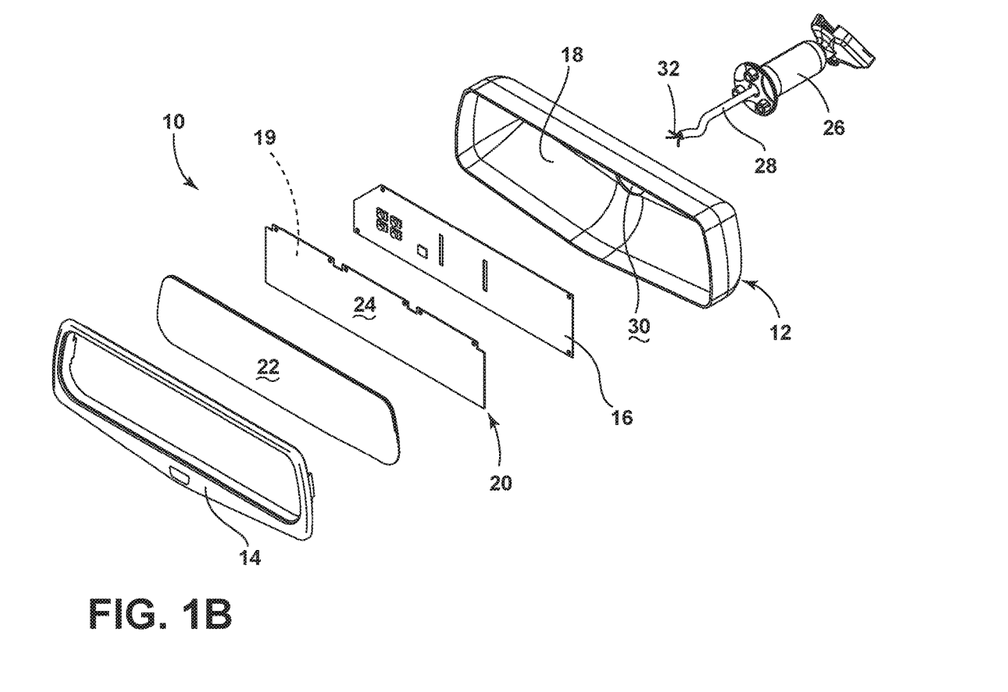
FIG. 1B is an exploded view of the rearview mirror assembly shown in FIG. 1A.

Referring to FIGS. 1A and 1B, a rearview mirror assembly 10 is exemplarily shown including a housing 12 and a bezel 14. A printed circuit board (PCB) 16 is disposed inside the housing 12 and generally faces a rear interior surface 18 of the housing 12. The PCB 16 may be assembled to a first side 19 of a carrier plate 20 and a mirror element 22 may be assembled to a second side 24 of the carrier plate 20. In some embodiments, the mirror element 22 may be an electro-optic element. Upon assembling the PCB 16 and the mirror element 22 to the carrier plate 20, the carrier plate 20 may be assembled to the bezel 14 such that the mirror element 22 is visible when the bezel 14 is viewed head-on. The bezel 14 is then assembled to the housing 12. In alternative embodiments, the carrier plate 20 is omitted and the PCB 16 may be directly mounted to the mirror element 22.

As is further shown in FIGS. 1A and 1B, a mount 26 may be assembled to the rear of the housing 12. The mount 26 is generally adapted to be mounted inside a vehicle in a location proximate to or on a front windshield of the vehicle. The mount 26 may partially house an electrical cable 28, which is fed through an opening 30 formed through the rear interior surface 18 of the housing 12 and contains one or more insulated electrical wires 32 extending beyond the electrical cable 28. The electrical cable 28 may be connected to a vehicle bus and/or vehicle power supply in order to supply electrical signals and/or electrical power to various circuit elements of the PCB 16 when connected thereto. While the rearview mirror assembly 10 of the present embodiment has been generally described above as being an interior mirror assembly, it is to be understood that the rearview mirror assembly 10 may be configured as an exterior mirror assembly in alternative embodiments. Additionally, it is conceived that the assembly of the foregoing components of the rearview mirror assembly 10 may be achieved using any known means such as, for example, mechanical fasteners, adhesives, snap-fit fasteners, and the like.

Figure 2:
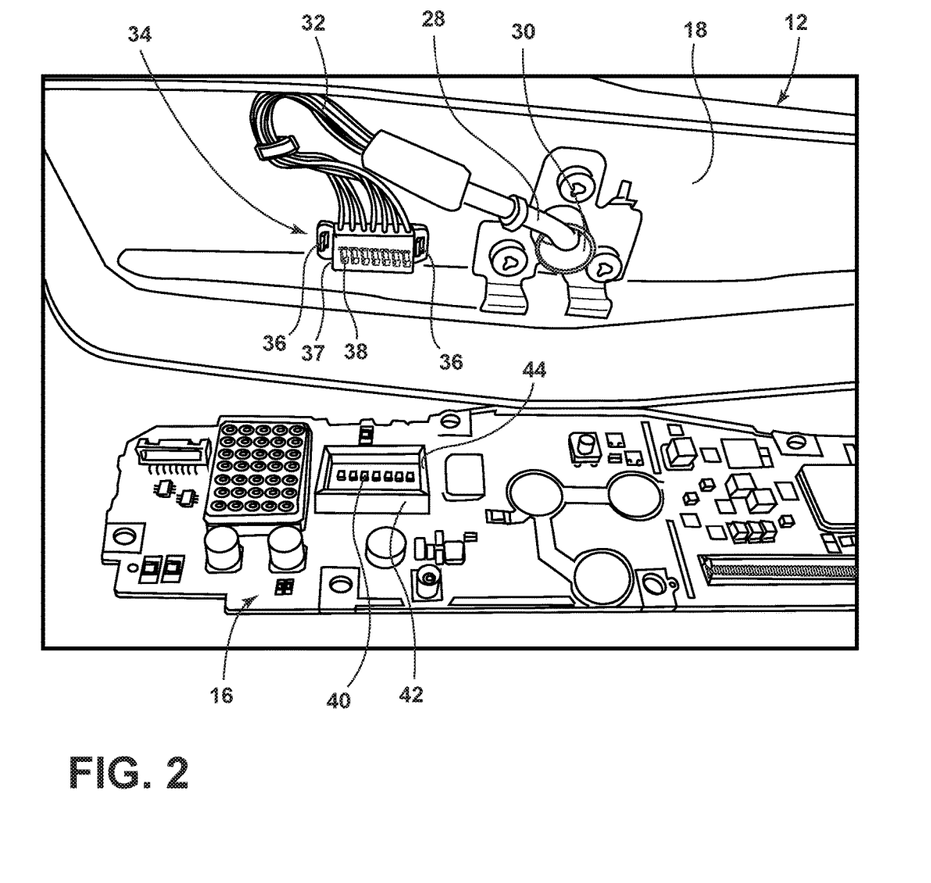
FIG. 2 illustrates an electrical cable ending in an electrical connector for connecting to a printed circuit board of the rearview mirror assembly.

Referring to FIG. 2, the electrical cable 28 is shown extending through the opening 30 and the electrical wires 32, exemplarily shown totaling seven in number, are terminally connected to an electrical connector 34. The electrical connector 34 is secured to the rear interior surface 18 of the housing 12 via one or more ribs 36 extending normally with respect to the rear interior surface 18. While seven electrical wires 32 are shown, it is to be understood that more or less electrical wires 32 may be provided in alternative embodiments. Typically, the number of electrical wires 32 relates to the complexity of the PCB 16, that is, the amount of features controlled and implemented by the various circuit elements provided on the PCB 16 and whether PCB 16 is connected to a vehicle bus. Accordingly, rearview mirror assemblies offering multiple features may require more electrical wires than those having simpler functionality. For example, some rearview mirror assemblies offer features such as a display, an electro-optic element, a map light, a compass, an imager, a headlamp control system, or any other feature known in the art.

With continued reference to FIG. 2, the electrical connector 34 includes a block housing 37 and one or more biasing members 38 coupled thereto and extending therefrom. In the depicted embodiment, the number of biasing members 38 is complementary to the number of electrical wires 32 and each of the biasing members 38 is electrically coupled to a corresponding one of the electrical wires 32. The biasing members 38 are spaced apart in a row to compliment an equal number of electrical contacts 40 located on and spaced across the PCB 16, which is shown detached from the carrier plate 20 and corresponding bezel 14 for purposes of simplicity and illustration.

The electrical contacts 40 may each be in the form of a PCB pad and are enclosed by a guide member 42 dimensioned to receive the electrical connector 34. It is contemplated that the electrical connector 34 may be frictionally or otherwise engaged to the guide member 42. In assembly, the guide member 42 may be coupled to the PCB 16 in a variety of ways. For example, it is conceived that the guide member 42 may be soldered to the PCB 16 using tin plated surface mounting tabs attached to the guide member 42. Alternatively, it is conceived that the guide member 42 may be assembled to the PCB 16 using pins that are partially inserted into the guide member 42 and pin in paste soldered into corresponding plated through holes formed in the PCB 16. Alternatively still, it is conceived that one or more alignment pins may be inserted into corresponding holes in the PCB 16. These alignment pins would interface with corresponding interference fit holes formed in the guide member 42 to secure the guide member 42 to the PCB 16.

With further reference to FIG. 2, the guide member 42 is located on the PCB 16 in positional alignment with the electrical connector 34 such that the electrical connector 34 is able to be blindly mated to the guide member 42 during assembly of the bezel 14 to the housing 12. As a self-aligning feature, the guide member 42 may include one or more tapered portions 44. In this manner, a slight misalignment between the electrical connector 34 and the guide member 42 will result in the electrical connector 34 being eventually guided into the mated position. Additionally, the electrical connector 34 may have one or more chamfered edges that complement the tapered portions 44 and further assist with the self-aligning feature. In the mated position, each of the biasing members 38 contact and exert a biasing force against a corresponding electrical contact 40 of the PCB 16, resulting in an electrical connection being made between the electrical connector 34 and the PCB 16. It is contemplated that the biasing members 38 may be constructed from silver, tin, gold, or other electrically conductive material compatible with the electrical contacts 40.

Figure 3:
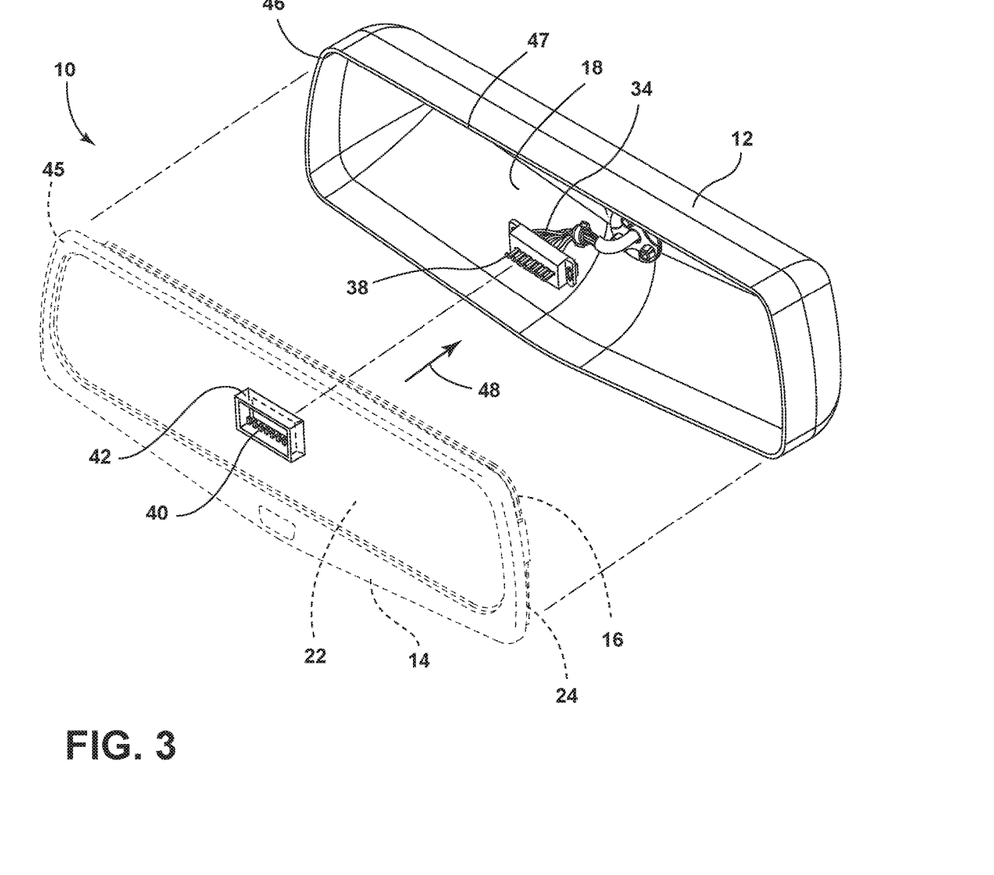
FIGS. 3 and 4 illustrate the assembly of a bezel to a housing of the rearview mirror assembly.
Figure 4:
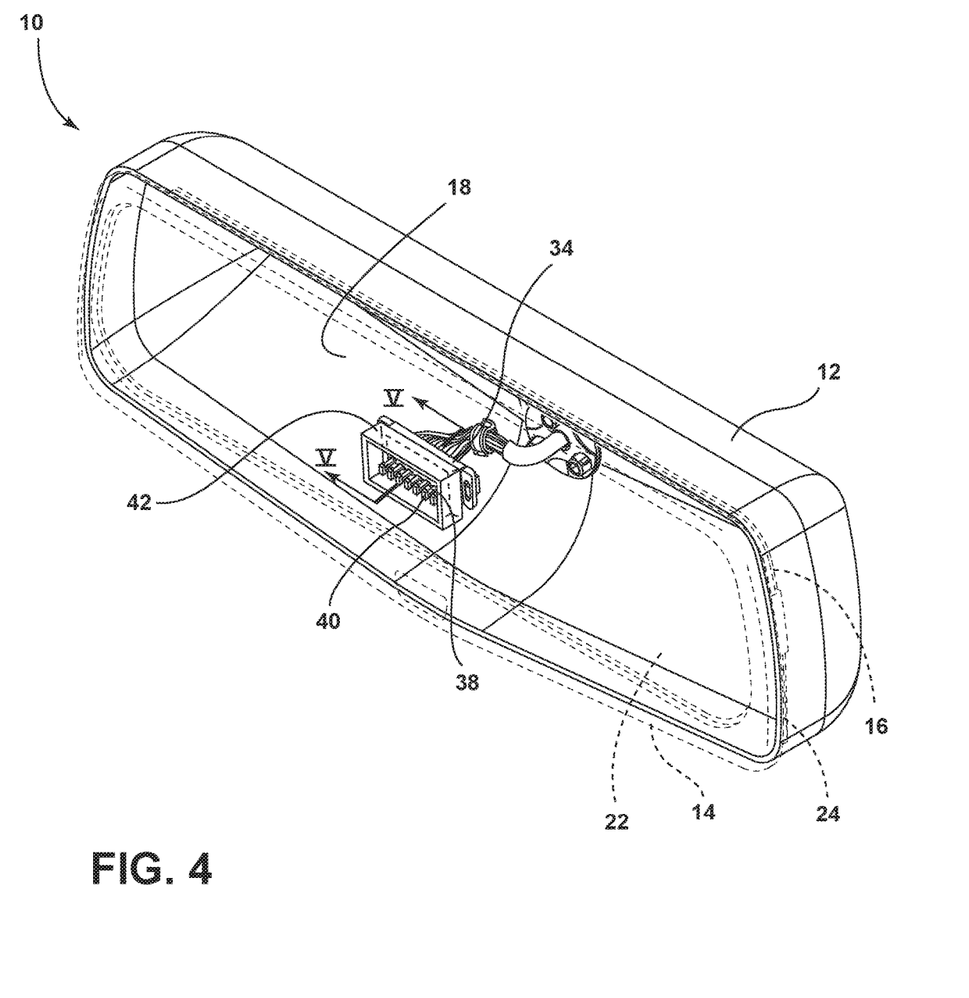

Referring to FIGS. 3 and 4, the assembly of the bezel 14 to the housing 12 is shown. For purposes of illustration and clarity, the bezel 14, mirror element 22, carrier 24, and PCB 16 are shown in phantom lining. As shown, an outer peripheral edge 45 of the bezel 14 is generally aligned to an outer peripheral edge 46 defined by an open end 47 of the housing 12 to which the bezel 14 is received. Once aligned, the PCB 16 faces the rear interior surface 18 of the housing 12 and the electrical connector 34 is also generally aligned with the guide member 42. In assembly, the bezel 14 may be moved toward the open end 47 of the housing 12 in the direction generally specified by arrow 48. The bezel 14 may be assembled to the housing 12 using any known means such as mechanical fasteners, adhesives, snap-fit fasteners, or a combination thereof. As the bezel 14 is being assembled to the housing 12, the electrical connector 34 and guide member 42 are blindly mated together, thereby resulting in each of the biasing members 38 contacting and exerting a biasing force against the corresponding electrical contacts 40 of the PCB 16. As described herein, the guide member 42 may self-align with the electrical connector 34 via tapered portions 44. As such, the bezel 14 need not be in perfect alignment with the housing 12 during the assembly process.

Figures 5, 6:
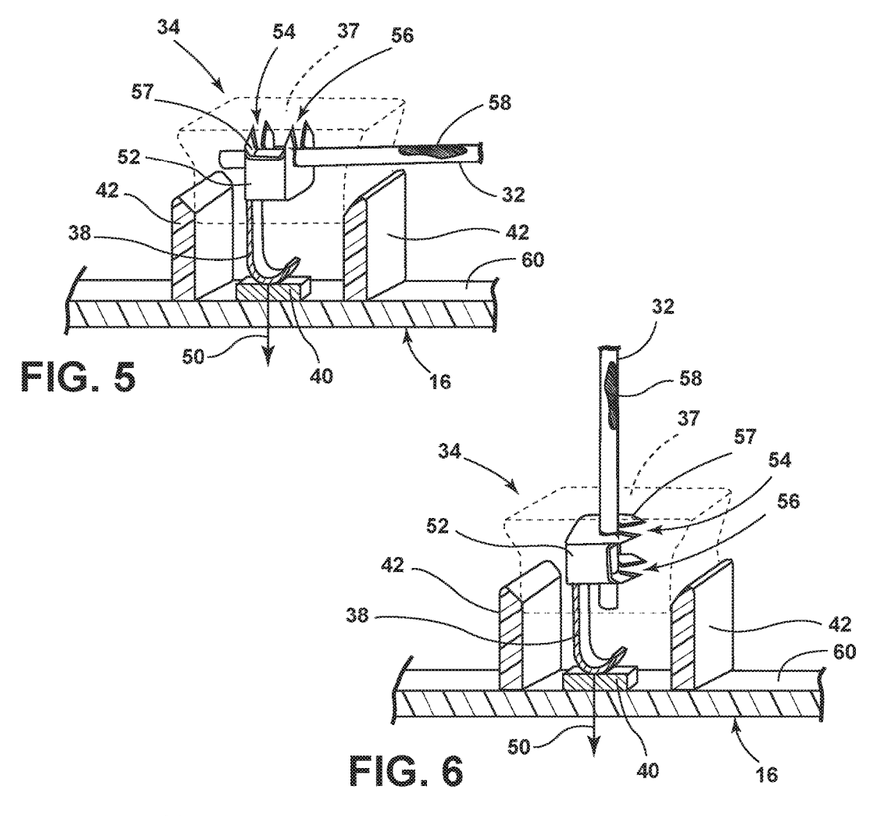
FIG. 5 is a simplified three-dimensional cross-sectional view taken along line V-V of FIG. 4 showing a single biasing member of the electrical connector, among other things.
FIG. 6 illustrates an alternative embodiment of the electrical connector shown in FIG. 5.
Figure 7:
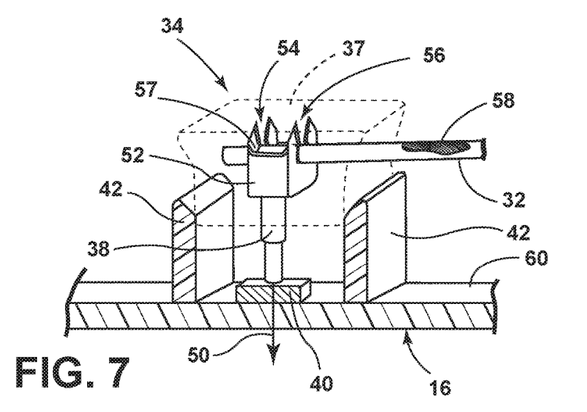
FIG. 7 illustrates another alternative embodiment of the electrical connector shown in FIG. 5.

Referring to FIGS. 5-7, the electrical connector 34 is shown mated to the guide member 42. For purposes of understanding and clarity, a coupling between a single biasing member 38 and a corresponding electrical contact 40 will be described. However, it will be readily appreciated that other biasing members 38 may be similarly coupled to their corresponding electrical contacts 40. In the mated position, the biasing member 38 contacts and exerts a biasing force against the electrical contact 40 in the direction generally specified by arrow 50. The biasing member 38 is coupled to the electrical connector 34 and is secured to a corresponding terminal block 52. The terminal block 52 is located within the block housing 37 of the electrical connector 34 and electrically couples the biasing member 38 to the electrical wire 32 associated therewith. In the depicted embodiment, the terminal block 52 includes one or more insulation-displacement contacts (IDCs) exemplarily shown as IDCs 54 and 56 for securing the electrical wire 32. The IDCs 54, 57 each have a pair of facing blades 57 arranged in tandem for bypassing the insulation of the electrical wire 32 when the same is forced therebetween, thereby enabling the biasing member 38 to make an electrical connection with a conductor 58 inside the electrical wire 32 without having to strip the insulation therefrom.

It is conceived that the facing blades 57 of the IDCs 54, 56 may extend from the terminal block 52 so as to be orthogonal (e.g., FIGS. 5 and 7) or parallel (e.g., FIG. 6) relative to the PCB 16 in order to provide design flexibility with respect to the direction in which the electrical wire 32 is fed to the electrical connector 34. By providing multiple IDCs 54, 56, the electrical wire 32 may be held in place at multiple locations, resulting in a cold-welding between the IDCs 54, 56 and the conductor 58 of the electrical wire 32. Advantageously, the use of IDCs 54, 56 does not require a terminal to be crimped onto each electrical wire 32, thereby leading to greater structural stability. In contrast, crimped and blocked connectors, for example, would typically require terminals to be crimped onto the electrical wires 32 prior to routing the electrical wires 32 through the mount 26. Consequently, when the electrical wires 32 are routed through the mount 26, there is a possibility that they could be bent or deformed due to the force necessary to push the electrical wires 32 through the mount 26.

In the depicted embodiments of FIGS. 5 and 6, the biasing member 38 is configured as a leaf spring and may compress or expand based on the electrical member 34 being displaced relative to the guide member 42 in an inward or outward direction, respectively. In an alternative embodiment, the biasing member 38 may be configured as a coil spring. In yet another alternative embodiment, it is conceived that the biasing member 38 may be configured as a spring-loaded pin, as exemplarily shown in FIG. 7. With respect to the embodiments shown in FIGS. 5-7, it is to be understood that the terminal block 52 and the biasing member 38 may be unitary in construction or separately constructed and coupled together via any known means.

In FIGS. 5-7, the electrical contact 40 is generally shown as a PCB pad having a square shape. While the electrical contact 40 is generally shown elevated in relation to a side 60 of the PCB 16 facing the rear interior surface 18 of the housing 12, it is to be understood that the electrical contact 40 may be flush with the PCB 16 or otherwise provided below side 60. Additionally or alternatively, the PCB pad may be configured in other shapes of varying dimension, if desired. While the PCB 16 is generally shown and described herein as being a single sided PCB, it is to be understood that the PCB 16 may be double sided or multi-layer in alternative embodiments.

Figure 8:
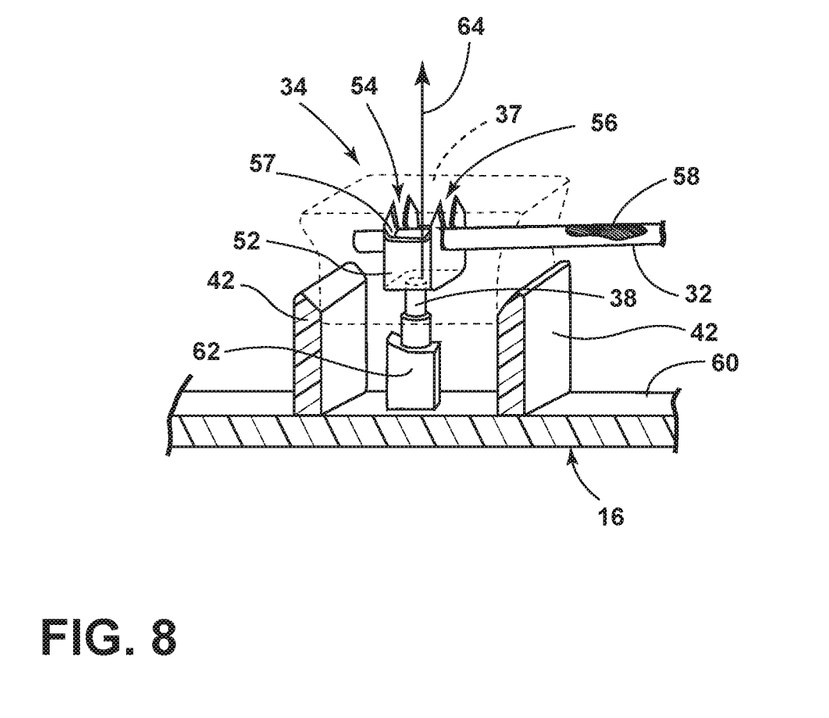
FIG. 8 illustrates yet another alternative embodiment of the electrical connector shown in FIG. 5.

Referring to FIG. 8, the biasing member 38 is alternatively provided as a surface mount device (SMD) of the PCB 16. Specifically, the biasing member 38 is exemplarily configured as a spring-loaded pin extending orthogonally from side 60 of the PCB 16. Alternatively, the biasing member 38 may be provided as a leaf spring or coil spring, if desired. The biasing member 38 is coupled to a stand 62 and is partially surrounded thereby. The stand 62 may be a unitary piece configured to lend support to each biasing member 38. It is contemplated that the stand 62 may be formed with the guide member 42 or provided separately. As depicted, the biasing member 38 is positioned on the PCB 16 to electrically connect with the corresponding terminal block 52 when the electrical connector 34 is mated with the guide member 42. The mating of the electrical connector 34 and the guide member 42 may occur through the self-aligning feature described previously herein. When the electrical connector 34 is mated to the guide member 42, the biasing member 38 contacts and exerts a biasing force against the electrical connector 34 in the direction generally specified by arrow 64. In assembly, each biasing member 38 may be insertion molded to the stand 62 and subsequently soldered to the PCB 16 via a pin and paste soldering process, for example. Alternatively, a post molding process may be utilized to insert each biasing member 38 into the stand 62 before soldering each biasing member 38 to the PCB 16. By providing the biasing member 38 separately from the electrical connector 34, construction of the terminal block 52 is simplified.

Accordingly, it will be appreciated that the biasing members 38 may be coupled to the electrical connector 34 or provided separately therefrom and coupled to the PCB 16. When the electrical connector 34 is properly mated with the guide member 42, the biasing members 38 are positioned between and in contact with the electrical connector 34 and the PCB 16. In such an arrangement, the biasing members 38 are configured to compress or expand in response to displacement (e.g., linear displacement) of the electrical connector 34 in relation to the guide member 42. The compression or expansion of the biasing members 38 serves to maintain an electrical connection between the PCB 16 and the electrical connector 34.

By virtue of the biasing members 38 directly contacting the PCB 16, the rearview mirror assembly 10, according to any of the embodiments described herein, benefits from a reduction in depth when compared to rearview mirror assemblies employing the use of a conventional pin header for connecting to a complimentary female electrical connector for receiving the pins of the pin header. This is due to the pin header typically having a base platform required for holding the pins in place so that they can be properly received in the female electrical connector. Consequentially, the resultant height of the base and length of the pins necessitates a greater housing depth, thus resulting in the rearview mirror assembly having a greater side profile. In contrast, due to the guide member 42 being open-ended, or said differently, lacking a base platform, the guide member 42 disclosed herein does not contribute to an overall size increase in the side profile of the rearview mirror assembly 10. Moreover, the guide member 42 may be constructed using a simple multi-cavity tool, thereby imparting a manufacturing cost reduction as compared to the cost associated with manufacturing a pin header.

As an additional downside, the connection between the pin header and the complimentary female electrical connector may result in fretting corrosion due to vibration of the rearview mirror assembly during vehicle travel or a user adjusting the rearview mirror assembly. Additionally, fretting corrosion may be experienced as a result of one or more components of the rearview mirror assembly expanding or compressing due to temperature fluctuations. What's more, the effects of expansion or compression may lead to a lost connection between the pin header and the female connector as a result of the pins coming unconnected or possibly damaged, thereby preventing electrical signals and/or electrical power from being supplied to a PCB of the rearview mirror assembly.

In contrast, fretting corrosion between the biasing members 38 and the PCB 16 is substantially minimized due the guide member 42 securely holding the electrical connector 34 in place. Accordingly, vibratory or user-produced motion of the rearview mirror assembly 10, including side-by-side motion, up-and-down motion, and/or front-to-back motion of the rearview mirror assembly 10, has little impact on the electrical connection between the electrical connector 34 and the PCB 16. In the event compression or expansion (e.g., of the rearview mirror assembly 10 or components thereof) causes displacement of the electrical connector 34 relative to the guide member 42, the biasing members 38 respond by compressing or expanding such that the electrical connector 34 remains electrically connected to the PCB 16. As a result of the biasing members 38 being able to compensate for displacement of the electrical connector 34 relative to the guide member 42, the electrical connection between the electrical connector 34 and the PCB 16 may be maintained despite fluctuations in temperature or other considerations leading to the displacement of the electrical connector 34. Accordingly, the rearview mirror assembly 10 provided herein offers greater reliability over those employing conventional connections between female electrical connectors and pin headers.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical and/or mechanical) directly or indirectly to one another. Such joining may be stationary in nature or movable in nature. Such joining may be achieved with the two components (electrical and/or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A rearview mirror assembly comprising:
a printed circuit board (PCB);
an electrical connector electrically coupled to the PCB; and
at least one biasing member that is electrically conductive and positioned between and in contact with the PCB and the electrical connector, wherein the at least one biasing member is configured to compress or expand in response to displacement of the electrical connector, and wherein compression or expansion of the at least one biasing member serves to maintain an electrical connection between the PCB and the electrical connector.

2. The assembly of claim 1, wherein the at least one biasing member comprises one of a leaf spring, a coil spring, and a spring-loaded pin.

3. The assembly of claim 1, wherein the at least one biasing member is coupled to the electrical connector and is configured to exert a biasing force against an electrical contact of the PCB.

4. The assembly of claim 1, wherein the at least one biasing member is coupled to the PCB and is configured to exert a biasing force against the electrical connector.

5. The assembly of claim 1, further comprising a guide member coupled to the PCB and configured to receive the electrical connector.

6. The assembly of claim 5, wherein the electrical connector and the guide member are in positional alignment such that the electrical connector is blindly mated to the guide member during assembly.

7. The assembly of claim 5, wherein the electrical connector is frictionally engaged to the guide member.

8. A rearview mirror assembly comprising:
a housing;
a printed circuit board (PCB) disposed inside the housing;
a guide member coupled to the PCB;
an electrical cable provided inside the housing and having a plurality of electrical wires terminally connected to an electrical connector received in the guiding member and electrically coupled to the PCB;
a plurality of biasing members, each of which is positioned between and in contact with the PCB and the electrical connector for electrically coupling a corresponding one of the plurality of electrical wires to the PCB, wherein the plurality of biasing members are configured to compress or expand in response to displacement of the electrical connector in relation to the guide member, and wherein compression or expansion of the plurality of biasing members serves to maintain an electrical connection between the PCB and the electrical connector.

9. The assembly of claim 8, wherein each of the biasing members comprises one of a leaf spring, a coil spring, and a spring-loaded pin.

10. The assembly of claim 8, wherein the plurality of biasing members are coupled to the electrical connector and are each configured to exert a biasing force against a corresponding electrical contact of the PCB.

11. The assembly of claim 8, wherein the electrical connector comprises a block housing having a plurality of terminal blocks, each of which is configured to electrically couple a biasing member with the corresponding one of the electrical wires and each having one or more insulation-displacement contacts for securing the corresponding one of the electrical wires.

12. The assembly of claim 8, wherein the plurality of biasing members are coupled to the PCB and are each configured to exert a biasing force against the electrical connector.

13. The assembly of claim 12, wherein the plurality of biasing members are soldered to the PCB and are each coupled to a stand configured to partially surround each of the plurality of biasing members.

14. The assembly of claim 13, wherein the stand is part of the guide member.

15. A rearview mirror assembly comprising:
a housing;
an electrical cable fed through the housing and having a plurality of electrical wires terminally connected to an electrical connector secured to a rear interior surface of the housing;
a printed circuit board (PCB) disposed inside the housing to face the rear interior surface and having a guide member coupled thereto and configured to receive the electrical connector therein; and
a plurality of biasing members, each of which is configured to electrically couple a corresponding one of the plurality of electrical wires to the PCB;
wherein the PCB is assembled to the housing via a self-aligning feature in which the electrical connector is blindly mated to the guide member;
wherein when the electrical connector is mated to the guide member, each of the plurality of biasing members is positioned between and in contact with the PCB and the electrical connector;
wherein the plurality of biasing members are configured to compress or expand in response to displacement of the electrical connector in relation to the guide member; and
wherein compression or expansion of the plurality of biasing members serves to maintain an electrical connection between the PCB and the electrical connector.

16. The assembly of claim 15, wherein each of the biasing members comprises one of a leaf spring, a coil spring, and a spring-loaded pin.

17. The assembly of claim 15, wherein the plurality of biasing members are coupled to the electrical connector and are each configured to exert a biasing force against a corresponding electrical contact of the PCB.

18. The assembly of claim 15, wherein the plurality of biasing members are coupled to the PCB and are each configured to exert a biasing force against the electrical connector.

19. The assembly of claim 15, wherein the electrical connector comprises a block housing having a plurality of terminal blocks, each of which is configured to electrically couple a biasing member with the corresponding one of the electrical wires.

20. The assembly of claim 19, wherein each of the plurality of terminal blocks comprises one or more insulation-displacement contacts for securing the corresponding one of the electrical wires.

* * * * *